US007221323B2

(12) United States Patent
Schantz et al.

(10) Patent No.: US 7,221,323 B2
(45) Date of Patent: May 22, 2007

(54) TAG-ALONG MICROSENSOR DEVICE AND METHOD

(76) Inventors: Hans Gregory Schantz, 515 Sparkman Dr., Huntsville, AL (US) 35816; Barbara McNew Schantz, 2416 Little Cove Rd., Hampton Cove, AL (US) 35763; Jerome Sylvester Gabig, 4811 Cove Creek Dr., Brownsboro, AL (US) 35741

( * ) Notice: Subject to any disclaimer, the term of this patent is extended or adjusted under 35 U.S.C. 154(b) by 0 days.

(21) Appl. No.: 11/474,770

(22) Filed: Jun. 26, 2006

(65) Prior Publication Data

US 2006/0238422 A1 Oct. 26, 2006

Related U.S. Application Data

(63) Continuation-in-part of application No. 11/010,083, filed on Dec. 11, 2004, now Pat. No. 7,068,225.

(60) Provisional application No. 60/529,064, filed on Dec. 12, 2003.

(51) Int. Cl.
*H01Q 1/38* (2006.01)
*H04B 1/34* (2006.01)

(52) U.S. Cl. .............................. 343/700 MS; 343/701; 343/700 MS; 455/96

(58) Field of Classification Search ................ 343/718, 343/700 MS, 701; 455/96; 340/539.1, 870.01
See application file for complete search history.

(56) References Cited

U.S. PATENT DOCUMENTS

| | | | | |
|---|---|---|---|---|
| 2,717,437 | A | 9/1955 | De Mestral | |
| 3,253,588 | A * | 5/1966 | Vuilleumier et al. | 600/508 |
| 5,382,788 | A | 1/1995 | Kim et al. | |
| 5,444,308 | A | 8/1995 | O'Laughlin | |
| 5,656,873 | A | 8/1997 | O'Laughlin | |
| 5,957,854 | A * | 9/1999 | Besson et al. | 600/509 |
| 6,315,719 | B1 * | 11/2001 | Rode et al. | 600/300 |
| 6,615,074 | B2 | 9/2003 | Mickle et al. | |
| 6,692,446 | B2 * | 2/2004 | Hoek | 600/585 |
| 6,804,561 | B2 * | 10/2004 | Stover | 607/60 |
| 2006/0046664 | A1 * | 3/2006 | Paradiso et al. | 455/96 |

* cited by examiner

*Primary Examiner*—Tho Phan
*Assistant Examiner*—Chuc Tran

(57) ABSTRACT

A tag-along microsensor device comprises a means for transmitting a signal, adhesion means, and sensing means. In a preferred embodiment, a means for transmitting a signal includes a nano-antenna apparatus. Adhesion means may include mechanical, magnetic, or static electric adhesion means. Mechanical adhesion means may include a hook or barb, or a chemical adhesion means such as glue or other sticky chemical adhesive. Sensing means may include sensing of audio signals, accelerometers, gyros, or other sensors.

17 Claims, 6 Drawing Sheets

100

200

300

400

500

600

700

800

900

1000

TAG-ALONG MICROSENSOR DEVICE AND METHOD

This application is a continuation-in-part of applicant's "Nano-antenna apparatus and method," filed Dec. 11, 2004 as application Ser. No. 11/010,083 (published Jun. 16, 2005 as US 2005/0128146 A1), U.S. Pat. No. 7,068,225, which claims benefit of prior filed provisional patent application Ser. No. 60/529064 filed Dec. 12, 2003. All of the above cited applications are incorporated herein by reference.

BACKGROUND OF THE INVENTION

1. Field of the Invention

The present invention relates to micro-sensors, particularly micro-sensors capable of adhering to a person, animal or vehicle and wireless relaying relevant position or other sensor information. The present invention further relates to a microsensor method of operation. Secondarily, the present invention also relates to antennas and to a system and method to utilize a conducting enclosure as a highly efficient electrically small antenna.

2. Description of the Prior Art

Ultra-wideband (UWB) systems are in great demand for precision tracking, radar, and communications. A commercially successful UWB system must be both small and very low power. Similarly, there is great interest at present in "smart dust," miniature sensors, and other nano-devices that can wirelessly transmit data, positioning signals, or radar signals using very low power signals and utilizing wavelengths that may be much larger than the device itself. Highly efficient, electrically small antennas are a necessity for UWB systems, smart dust, nano-devices, and numerous other commercial and government applications.

Prior art efficient antennas commonly are on the order of a half-wavelength long for a dipole or a quarter-wavelength long for a monopole. For ultra-wideband (UWB) operation in the 3.1–10.6 GHz, a 5.3 cm dipole or a 2.6 cm monopole are called for (5.7 GHz center frequency). These antennas may be small enough for some applications. For other applications, even smaller antennas may be required. Efficient quarter to half wave antennas that operate in the upper VHF band or UHF band (for instance from 100 MHz on up) must be significantly larger than analogous microwave antennas. This is too large for many potential applications. In general however, no matter the application, there is always a need to make antennas smaller and less obtrusive while remaining efficient. Existing small VHF/UHF UWB antennas tend to be very inefficient including large current radiators, and resistively loaded antennas. Antennas smaller than a quarter-wavelength are usually referred to as electrically small antennas. In prior art, electrically small antennas are prone to be inefficient, particularly when significantly smaller than a quarter-wavelength.

In view of the foregoing, there is a great need for an efficient, electrically small UWB antenna for positioning, smart dust, nano-devices, and other applications. There is a further need for a method to effect efficient UWB transmissions from electrically small enclosures. Additionally, there is a need for an antenna apparatus that transcends traditionally accepted bounds of antenna size versus performance. There is a further need for a microsensor capable of adhering to a person, animal, or vehicle, and wirelessly relaying telemetry, sensor, position, and other data. These needs and more are met by the present invention.

SUMMARY OF THE INVENTION

Accordingly it is an object of the present invention to provide a microsensor capable of adhering to a person, animal, or vehicle, and wirelessly relaying telemetry, sensor, position, and other data. This need and others are met by a tag-along microsensor device and method.

A tag-along microsensor device comprises a means for transmitting a signal, adhesion means, and sensing means. In a preferred embodiment, a means for transmitting a signal includes a nano-antenna apparatus. Adhesion means may include mechanical, magnetic, or static electric adhesion means. Mechanical adhesion means may include a hook or barb, or a chemical adhesion means such as glue or other sticky chemical adhesive. Sensing means may include sensing of audio signals, accelerometers, gyroscopes, compass, gyrocompasses, or other sensors.

Alternatively, a tag-along microsensor method includes the steps of deploying a tag-along microsensor, transmitting a signal from a tag-along microsensor, receiving a signal, and acting on a signal. In a preferred embodiment, transmitting a signal includes the steps of charging a first conducting surface with respect to a second conducting surface, and discharging a first conducting surface with respect to a second conducting surface, so that the discharging forms a substantially continuous closed conducting shell from a first conducting surface and a second conducting surface. In other embodiments, deploying a tag-along microsensor results in a tag-along microsensor adhering to an entity such as a person, vehicle, or animal. In still further embodiments, receiving a signal may involve receiving a signal is in the vicinity of a location where a tag-along microsensor was deployed or at a location a substantial distance from where said tag-along microsensor was deployed. Acting on a signal may include recording data from a signal or intercepting an entity to which a tag-along microsensor is attached.

With these and other objects, advantages, and features of the invention that may become hereinafter apparent, the nature of the invention may be more clearly understood by reference to the detailed description of the invention, the appended claims and to the several drawings herein.

DETAILED DESCRIPTION OF THE PREFERRED EMBODIMENT

Overview of the Invention

The present invention is directed to a tag-along microsensor device and method. A tag-along microsensor is a device capable of adhering to a person, animal, or vehicle and wirelessly relaying telemetry, sensor, position or other data. In a preferred embodiment, a tag-along microsensor employs a nano-antenna apparatus to effect wireless transmission.

The present invention is further directed to a nano-antenna apparatus and method. Instead of an antenna apparatus distinct from an associated RF device as taught in the prior art, the present invention teaches that an enclosure surrounding an RF device be used as an antenna. This conducting enclosure antenna makes best possible use of the available form factor for an RF device. Thus, a conducting enclosure antenna provides performance superior to a smaller antenna that is a mere adjunct to the device. A conducting enclosure antenna is also a "nano-antenna," an antenna that potentially transcends traditionally accepted limits to antenna size and performance by offering the performance and efficiency of a typical quarter-wave antenna in a package that may 1% of a wavelength in dimension or even smaller. A nano-antenna apparatus is well-suited for use in conjunction with a tag-along microsensor.

The present invention will now be described more fully in detail with reference to the accompanying drawings, in which the preferred embodiments of the invention are shown. This invention should not, however, be construed as limited to the embodiments set forth herein; rather, they are provided so that this application will be thorough and complete and will fully convey the scope of the invention to those skilled in the art. Like numbers refer to like elements throughout.

Nano-Antenna Apparatus

Figure 1:
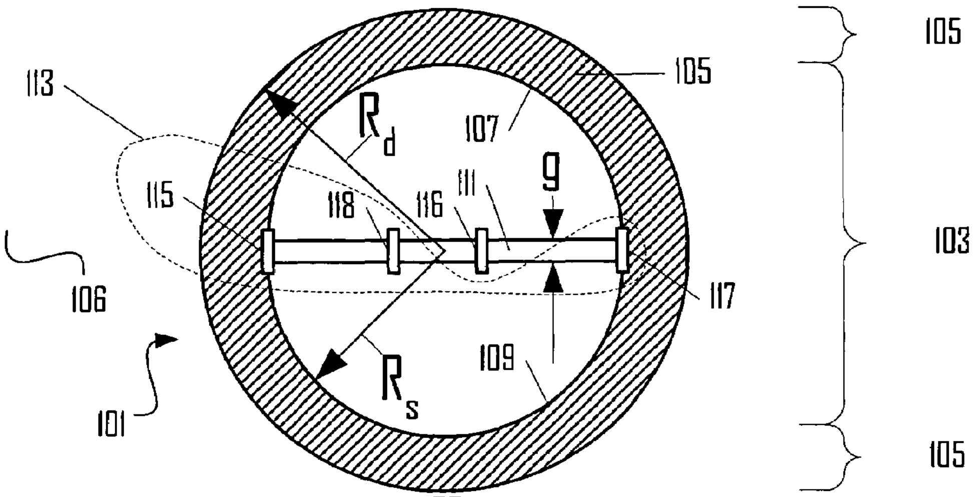
FIG. 1 is a cross-section of a preferred embodiment nano-antenna apparatus.

FIG. 1 is a cross-section 100 of a preferred embodiment nano-antenna device 101. Preferred embodiment nano-antenna device 101 comprises conducting enclosure antenna 103, and dielectric layer 105. For ease of theoretical calculation, conducting enclosure antenna 103, is assumed to be spherical with radius $R_s$, and dielectric layer 105 is assumed to have a thickness $R_d$–$R_s$. Thus, nano-antenna device 101 has a total radius $R_d$. In practice, nano-antenna device 101 may assume a wide variety of form factors suitable for particular applications. Some of these form factors will be discussed later as particular alternate embodiments. Dielectric layer 105 also acts so as to electrically insulate conducting enclosure antenna 103 from electrical contact with surrounding space 106. Surrounding space 106 may include not only free space, but also ground, human bodies, and any other objects in the immediate vicinity of nano-antenna device 101. In practice, since most of the electrostatic energy is concentrated around the gap, it may be preferred for dielectric layer 105 to be thicker in the vicinity of the gap or have another non-uniform thickness profile. Similarly, dielectric layer 105 need not be characterized by a fixed dielectric constant, but rather may have a dielectric constant that varies according to a desired impedance taper.

Conducting enclosure antenna 103 further comprises a first conducting surface 107, a second conducting surface 109, and discharge switching means 113. First conducting surface 107, and second conducting surface 109 are separated by a gap region 111 with gap width g. Discharge switching means 113 further comprises first boundary discharge switch 115 and second boundary discharge switch 117. First boundary discharge switch 115 and second boundary discharge switch 117 are preferentially high efficiency switches capable of switching speeds substantially faster than a characteristic time associated with a radiated signal from nano-antenna device 101. First boundary discharge switch 115 and second boundary discharge switch 117 may be step recovery or other diodes, FET or other high speed transistors, MEMS devices, or other high speed, high efficiency switching devices. In alternate embodiments, discharge switching means 113 may further comprise filtering means to enable nano-antenna device 101 to radiate signals within a desired spectral mask. In a preferred embodiment, first boundary discharge switch 115 and second boundary discharge switch 117 act so as to electrically isolate gap region 111 from dielectric layer 105 and surrounding space 106. In optional embodiments, discharge switching means 113 may further comprise internal discharge switch 118.

In a preferred mode of operation, conducting enclosure antenna 103 begins in a charged state with first conducting surface 107 charged to a particular voltage with respect to second conducting surface 109. Conversely (and equivalently), one may think of second conducting surface 109 charged to a particular voltage with respect to first conducting surface 107. Charging switch 116 is useful in this charging process as will be explained further in reference to effective electrical circuit diagram 200. Gap region 111, dielectric layer 105, and surrounding space 106 store electrostatic energy $U_{tot}=U_{in}+U_{out}$ associated with the original charged state of first conducting surface 107 with respect to second conducting surface 109. Discharge switching means 113 then acts so as to discharge first conducting surface 107 and second conducting surface 109. Simultaneously, discharge switching means 113 acts so as to electrically isolate gap region 111 from dielectric layer 105 and surrounding space 106. Thus in a preferred mode of operation, discharge switching means 113 partitions outside electrostatic energy $U_{out}$ from inside electrostatic energy $U_{in}$. Discharge switching means 113 thus causes outside electrostatic energy $U_{out}$ stored in dielectric layer 105 and surrounding space 106 to be isolated, to decouple, and to radiate away as a UWB impulse. Discharge switching means 113 causes inside electrostatic energy $U_{in}$ stored in gap region 111 to be absorbed or dissipated.

In a preferred mode of operation, nano-antenna device 101 becomes a radiator of electromagnetic ultra-wideband impulses associated with the decoupling of outside electrostatic energy $U_{out}$ originally stored in dielectric layer 105 and surrounding space 106. The efficiency of nano-antenna device 101 is a function of the fraction of energy originally stored in dielectric layer 105 and surrounding space 106 to the total electrostatic energy.

One may improve efficiency of nano-antenna device 101 by minimizing electrostatic energy $U_{in}$ stored in gap region 111. Electrostatic energy $U_{in}$ stored in gap region 111 may be minimized by filling gap region 111 with a relatively low dielectric constant medium such as free space or air. Electrostatic energy $U_{in}$ stored in gap region 111 may further be minimized by controlling the geometry of gap region 111. For instance one might maximize gap with g subject to other design constraints.

Alternatively, one may improve efficiency of nano-antenna device 101 by maximizing electrostatic energy $U_{out}$ stored in dielectric layer 105 and surrounding space 106. Electrostatic energy $U_{out}$ stored in dielectric layer 105 and surrounding space 106 may be maximized employing a relatively high dielectric constant medium in dielectric layer 105. Electrostatic energy $U_{out}$ stored in dielectric layer 105 and surrounding space 106 may further be maximized by controlling the geometry of first conducting surface 107 and second conducting surface 109.

In summary, by minimizing electrostatic energy stored in gap region 111 $U_{in}$ and/or by maximizing electrostatic energy $U_{out}$ stored in dielectric layer 105 and surrounding space 106 efficiency of nano-antenna device 101 can be made very high, even though nano-antenna device 101 may be electrically quite small. These and other details of the present invention will become clear upon understanding an effective electrical circuit and a process flow diagram.

Effective Electrical Circuit

Figure 2:
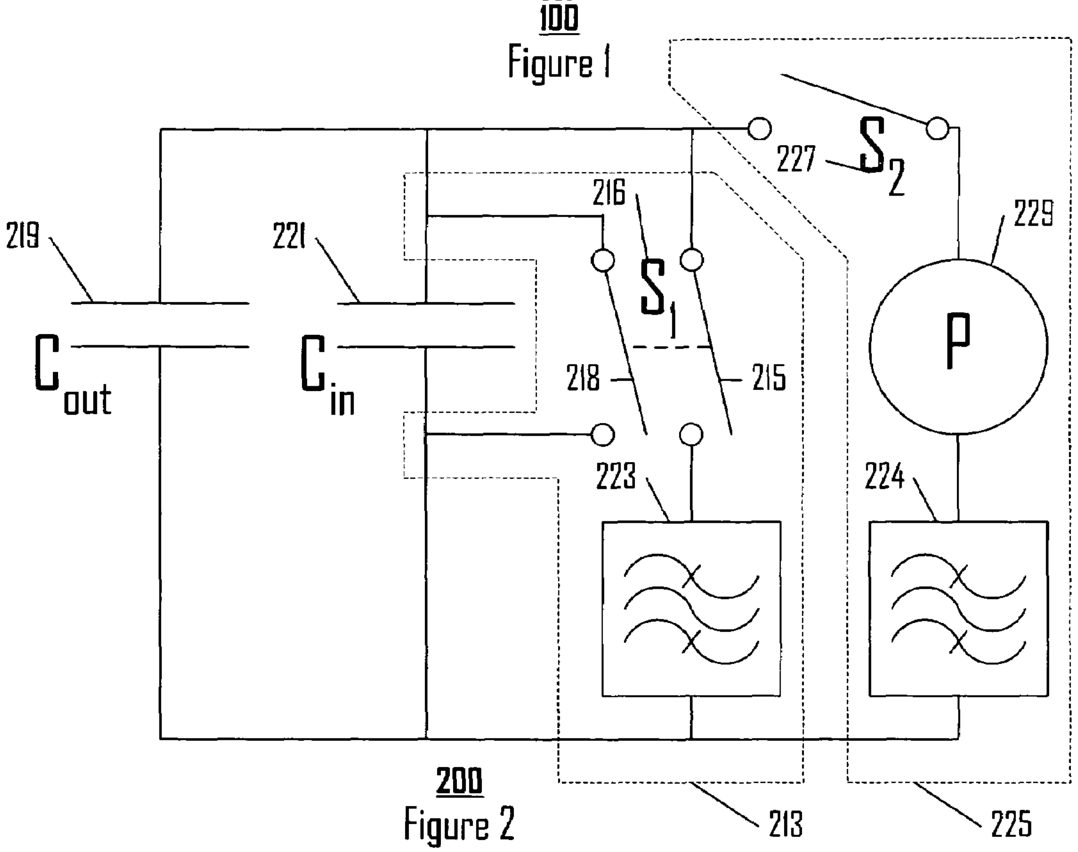
FIG. 2 is an effective electrical circuit diagram for a nano-antenna apparatus.

FIG. 2 is an effective electrical circuit diagram 200 for nano-antenna apparatus 101. First conducting surface 107, second conducting surface 109, dielectric layer 105, and surrounding space 106 cooperate to form outer capacitance $C_{out}$ 219. First conducting surface 107, second conducting surface 109, and gap region 111 cooperate to form inner capacitance $C_{in}$ 221. Discharge switching means 213 comprises discharge switch $S_1$ 216.

Discharge switch $S_1$ 216 comprises boundary discharge switch 215. Boundary discharge switch 215 in effective electrical circuit diagram 200 represents a plurality of actual switches such as first boundary discharge switch 115 and second boundary discharge switch 117. In optional embodiments, discharge switch $S_1$ 216 may be a double pole single throw switch further comprising internal discharge switch 218. Internal discharge switch 218 acts so as to short out inner capacitance $C_{in}$ 221. Here again, internal discharge switch 218 in effective electrical circuit diagram 200 represents a plurality of actual switches such as internal discharge switch 118. To reiterate, although boundary discharge switch 215 is shown as a single individual boundary discharge switch 215 in effective electrical circuit diagram 200, boundary discharge switch 215 represents the functionality of potentially many actual switches distributed around the periphery of gap region 111.

Discharge switching means 213 may also include filtering means 223. Filtering means 223 may be designed so as to ensure that nano-antenna device 101 radiates signals with spectral content within a desired spectral mask. If radiation from nano-antenna device 101 is not subject to a spectral mask, then filtering means 223 may not be required. Filtering means 223 is preferentially a diplexing filter in which out of band components are dissipated instead of reflected.

In alternate embodiments, discharge switching means 213 may be intended to discharge the parallel combination of outer capacitance $C_{out}$ 219 and inner capacitance $C_{in}$ 221 so slowly as to radiate no appreciable energy (i.e. adiabatically). Also under these circumstances, discharge switching means 213 may not require filtering means 223.

In a preferred embodiment, discharge switching means 213 acts so as to electrically isolate outer capacitance $C_{out}$ 219 from inner capacitance $C_{in}$ 221. Energy stored in inner capacitance $C_{in}$ 221 will be dissipated, for instance in internal discharge switch 218. Discharge switching means 213 accomplishes this goal by transforming first conducting surface 107 and second conducting surface 109 into a continuous closed conducting surface that electrically isolates outer capacitance $C_{out}$ 219 from inner capacitance $C_{in}$ 221. Similarly discharge switching means 213 acts to isolate boundary discharge switch 215 from internal discharge switch 218 so that internal discharge switch 218 discharges only inner capacitance $C_{in}$ 221.

Nano-antenna apparatus 101 also includes additional functionality not shown in FIG. 1. Nano-antenna apparatus 101 further comprises charging means 225. Charging means 225 includes charging switch $S_2$ 227 and power source 229. Charging switch $S_2$ 227 may be implemented with step recovery or other diodes, FET or other high speed transistors, MEMS devices, or other switching devices. Power source 229 may further comprise a voltage source, battery, current source, charge pump, or other source of electric energy. Power source 229 also preferentially includes means for operation with alternate polarity so that nano-antenna device 101 can radiate flipped or BPSK signals.

In a preferred mode of operation, charging means 225 is intended to charge the parallel combination of outer capacitance $C_{out}$ 219 and inner capacitance $C_{in}$ 221 so slowly (adiabatically) as to radiate no appreciable energy. If charging means 225 is intended to charge the parallel combination of outer capacitance $C_{out}$ 219 and inner capacitance $C_{in}$ 221 so quickly as to radiate appreciable energy, then charging means 225 may further include filtering means 224 so as to ensure that nano-antenna device 101 radiates signals within a desired spectral mask.

Nano-Antenna Method of Operation

Figure 3:
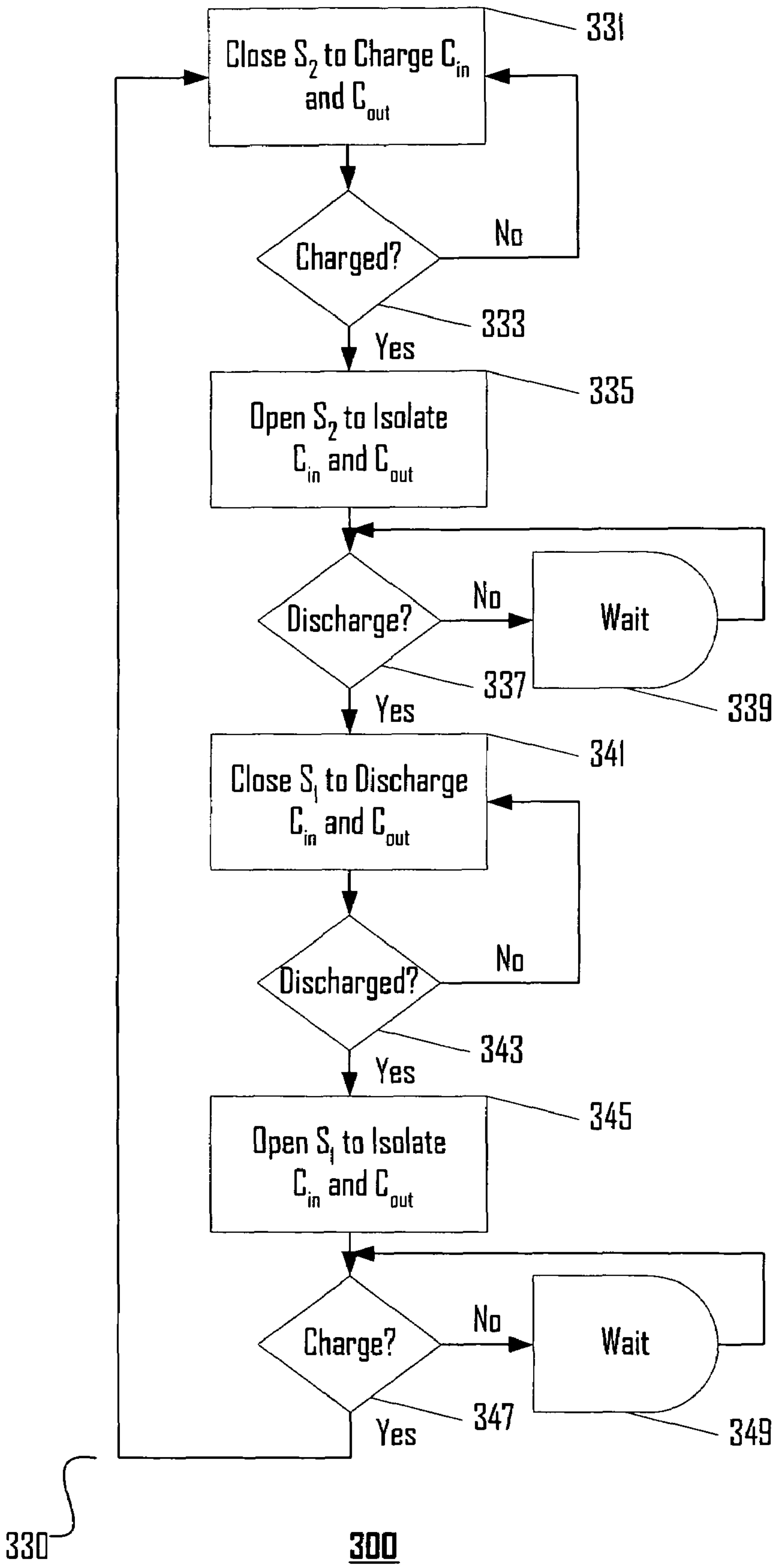
FIG. 3 is a flow chart describing a nano-antenna method of operation.

FIG. 3 is a flow chart 300 describing a method of operation 330 for transmitting UWB impulses. Method of operation 330 is a recursive operation that may repeat for as many cycles as are required to complete a desired transmission. nano-antenna method of operation 330 begins with process block 331 in which charging switch $S_2$ 227 closes to enable charging means 225 to charge the parallel combination of outer capacitance $C_{out}$ 219 and inner capacitance $C_{in}$ 221. In a preferred embodiment, process block 331 comprises a charging process in which charging takes place so slowly that substantially no radiation occurs (i.e. adiabatically). In alternate embodiments, process block 331 may comprise a charging process in which charging takes place so quickly that an impulse of radiation does occur. In further alternate embodiments, process block 331 may comprise a charging process with switchable polarity, thus enabling nano-antenna apparatus 101 to radiate signals with "flip" or BPSK modulation.

Method of operation 330 continues with decision block 333. Decision block 333 assesses whether the parallel combination of outer capacitance $C_{out}$ 219 and inner capacitance $C_{in}$ 221 is adequately charged. If "No," then method of operation 330 continues back at process block 331. If "Yes," then method of operation 330 continues at process block 335 in which charging switch $S_2$ 227 opens to isolate the parallel combination of outer capacitance $C_{out}$ 219 and inner capacitance $C_{in}$ 221.

Method of operation 330 continues with decision block 337. Decision block 337 assesses whether the time has arrived to discharge the parallel combination of outer capacitance $C_{out}$ 219 and inner capacitance $C_{in}$ 221. Decision block 337 (and potentially optional delay block 339) may act in accordance with a desired pulse position modulation scheme so as to cause a discharge and associated radiated energy to occur at a desired time. If "No," then method of operation 330 continues with optional delay block 339 before continuing back at decision block 337. If "Yes," then method of operation 330 continues at process block 341 in which discharge switch $S_1$ 216 closes to discharge the parallel combination of outer capacitance $C_{out}$ 219 and inner capacitance $C_{in}$ 221. In a preferred embodiment, process block 341 comprises a discharging process in which discharging takes place so quickly that an impulse of radiation does occur. In alternate embodiments, process block 341 comprises a discharging process in which discharging takes place so slowly that substantially no radiation occurs (i.e. adiabatically). For proper function as a radiating device, at least one of process block 331 and process block 341 must not be adiabatic in order for radiation to occur. In yet other alternate embodiments, process block 331 and process block 341 may vary between rapid and adiabatic charging and/or discharging, respectively, in accordance with a particular modulation scheme.

Method of operation 330 continues with decision block 343. Decision block 343 assesses whether the discharge of the parallel combination of outer capacitance $C_{out}$ 219 and inner capacitance $C_{in}$ 221 is complete. If "No," then method of operation 330 continues back at process block 341. If "Yes," then method of operation 330 continues at process block 345 in which discharge switch $S_1$ 216 opens to isolate the parallel combination of outer capacitance $C_{out}$ 219 and inner capacitance $C_{in}$ 221.

Method of operation 330 continues with decision block 347. Decision block 347 assesses whether the time has arrived to charge the parallel combination of outer capacitance $C_{out}$ 219 and inner capacitance $C_{in}$ 221. If "No," then method of operation 330 continues with optional delay block 349 before continuing back at decision block 347. If "Yes," then method of operation 330 continues back at process block 331.

Theory of Nano-Antenna Operation and Design Examples

In a preferred embodiment, nano-antenna apparatus 101 acts so as to isolate or partitions outside electrostatic energy ($U_{out}=\frac{1}{2}C_{out}V^2$) from inside electrostatic energy ($U_{in}=\frac{1}{2}C_{in}V^2$). Conducting enclosure antenna 103 forms a substantially continuous closed conducting surface that substantially partitions total energy into outside electrostatic energy $U_{out}$ and inside electrostatic energy $U_{in}$. Outside electrostatic energy $U_{out}$ then decouples and radiates away as a UWB impulse with a time dependence and frequency content dependent upon dimensional factors (like $R_s$ and $R_d$) as well as properties of dielectric layer 105. Since the same voltage difference V applies to both capacitances, outside electrostatic energy $U_{out}$ and inside electrostatic energy $U_{in}$. are directly proportional to outer capacitance $C_{out}$ 219 and inner capacitance $C_{in}$ 221, respectively. Thus, the efficiency η of nano-antenna apparatus 101 is:

$$\eta = \frac{U_{out}}{U_{tot}} = \frac{U_{out}}{U_{in}+U_{out}} = \frac{C_{out}}{C_{in}+C_{out}} \quad (1)$$

The severe dielectric interface may be prone to reflect signals and disperse the signals. Assuming dielectric losses and ohmic losses in conducting enclosure antenna 103, in dielectric layer 105, and discharge switching means 113 are negligible, the only other loss mechanism is radiation. A further consideration is that the boundary between dielectric layer 105 and surrounding space 106 lies within the near field zone, and thus energy is likely to "tunnel" through the boundary. In any event, a nano-antenna device 101 will radiate quite efficiently.

UHF Design Example

Consider spherical nano-antenna device 101 with a radius $R_s$=10 cm and no dielectric. Spherical nano-antenna device 101 will then exhibit dipole like behavior with half power points around 200 MHz and 1000 MHz. A 20 cm diameter spherical nano-antenna device 101 may be too large for many applications. Consider instead a spherical nano-antenna device 101 with a radius $R_s$=1 cm. By simple scaling relations, this dimensionally ten times smaller spherical nano-antenna device 101 will have a frequency response ten times higher: 2000 MHz to 10,000 MHz. Suppose this spherical nano-antenna device 101 with a radius $R_s$=1 cm is embedded in dielectric layer 105 composed of a high dielectric constant material (such as $TiO_2$ with relative dielectric constant $\epsilon_r$=100). Dielectric layer 105 may be thus characterized by a relative dielectric constant $\epsilon_r$. Since electrical size scales as $\sqrt{\epsilon_r}$, this spherical nano-antenna device 101 with a radius $R_s$=1 cm will now have the same frequency response as a spherical nano-antenna device 101 with a radius $R_s$=10 cm (i.e. 200 MHz to 1000 MHz). A dielectric layer 105 with thickness $R_s-R_d$ equal to radius $R_s$ is sufficient to encompass a region in which about 90% of outside electrostatic energy $U_{out}$ would be stored assuming there were no dielectric (other than free space). The exterior capacitance 219 will be about $C_{out}$=15 pF and the interior capacitance 221 will be about $C_{in}$=2 pF assuming a 60 mil gap. Thus a spherical nano-antenna device 101 with a conducting enclosure radius $R_s$=1 cm and a dielectric radius $R_d$=2 cm operating between 200–1000 MHz may be about the size of a golf ball with a diameter of 4 cm (a bit over 1.5 in). This nano-antenna device 101 will have an efficiency of:

$$\eta = \frac{C_{out}}{C_{in}+C_{out}} = \frac{15\text{pF}}{2\text{pF}+15\text{pF}} = 88\,\% \quad (2)$$

This efficiency is extraordinarily good for an antenna of electric radius 0.0133 λ(i.e. 2 cm radius antenna operational at 200 MHz or λ=1.5 m).

Microwave Design Example

For a microwave frequency range design example, the frequency response of the previous section may be scaled up by a factor of ten so that the operational frequency lies between 2–10 GHz. As noted in the previous section, a nano-antenna device 101 with $R_s$=1 cm has the correct frequency response, however the outside capacitance 219 will be about $C_{out}$=0.15 pF and the interior capacitance 221 will be about $C_{in}$=2 pF assuming a 60 mil gap. The efficiency will be:

$$\eta = \frac{C_{out}}{C_{in}+C_{out}} = \frac{0.15\text{pF}}{2\text{pF}+0.15\text{pF}} = 6.98\,\% \quad (3)$$

Ironically, an even smaller dielectrically loaded nano-antenna apparatus 101 will be more efficient.

Consider a nano-antenna device 101 with $R_s$=1 mm embedded in dielectric layer 105 composed of a high dielectric constant material (such as $TiO_2$ with relative dielectric constant $\epsilon_r$=100) out to a radius $R_d$=2 mm. Then the frequency response is as desired (2–10 GHz), the exterior capacitance 219 will be about $C_{out}$=1.5 pF and the interior capacitance 221 will be about $C_{in}$=0.2 pF assuming a 5 mil gap. As before:

$$\eta = \frac{C_{out}}{C_{in}+C_{out}} = \frac{1.5\text{pF}}{0.2\text{pF}+1.5\text{pF}} = 88\,\% \quad (4)$$

With such dimensions, one could encapsulate a chip and make an ultra miniature UWB transmitter limited only by the constraints of the battery or power scavenging means.

These two examples illustrate how proper choice of a dimension of a nano-antenna device volume (such as $R_s$ and $R_d$) and proper choice of a dielectric constant characterizing a dielectric layer result in a desired frequency response.

Detailed Description of Nano-Antenna Apparatus

Figure 4:
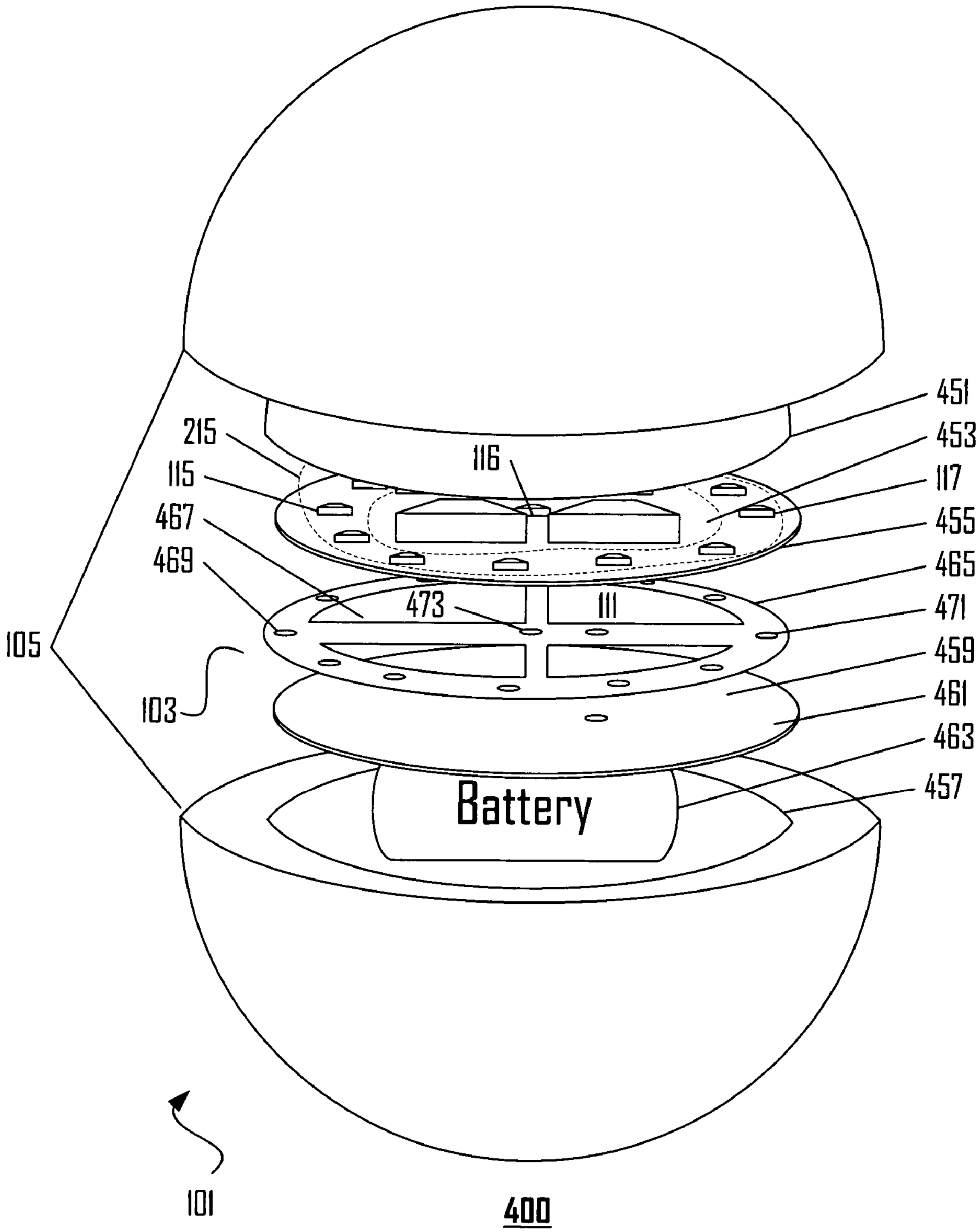
FIG. 4 is an exploded view of a preferred embodiment nano-antenna apparatus.

FIG. 4 is an exploded view 400 of a preferred embodiment nano-antenna apparatus 101. Nano-antenna apparatus 101 comprises dielectric layer 105 and conducting enclosure antenna 103. Conducting enclosure antenna 103 further comprises first conducting surface 107, second conducting surface 109, and gap region 111. Nano-antenna apparatus 101 occupies a substantially spheroidal volume.

First conducting hemisphere 451 and first ground plane 455 of first printed circuit board 453 cooperate to form first conducting surface 107. First conducting surface 107 forms a substantially closed conducting shell except for a limited number of optional pass-throughs, orifices, or vias to allow first printed circuit board 453 or other devices within first conducting surface 107 to connect to devices within second conducting surface 109, user interfaces, sensors, or other external devices. First printed circuit board 453 further provides a location for associated circuitry such as charging means 225 and discharge switching means 113. Additionally, first printed circuit board 453 may support control or processor functionality, sensor or transducer functionality, modulation functionality, input/output functionality, data storage functionality, or any other functionality useful for a particular application of nano-antenna device 101. In particular first printed circuit board 453 can support functionality to enable nano-antenna device 101 to be an electrically small transmitter capable of communication, positioning, radar, or other useful application. In alternate embodiments, first printed circuit board 453 can support functionality to enable nano-antenna device 101 to be a receiver as well as a transmitter. Any or all of these functionalities may be implemented in electronic devices within first conducting surface 107. "Electronic devices" include but are not necessarily limited to circuit board 453, other circuit boards, components, or other devices. Thus in a preferred embodiment, first conducting surface 107 is not only an antenna but also encloses electronic devices.

Second conducting hemisphere 457 and second ground plane 459 of second printed circuit board 461 cooperate to form second conducting surface 109. Second conducting surface 109 forms a substantially closed conducting shell except for a limited number of optional pass-throughs, orifices, or vias to allow second printed circuit board 461 or other devices within second conducting surface 109 to connect to devices within first conducting surface 107, user interfaces, sensors, transducers, or other external devices. For instance, second conducting surface 109 may enclose a battery 463 or other power supply means. Battery 463 may further function as a weight to tend to orient conducting enclosure antenna 103 in a desired orientation.

In alternate embodiments, printed circuit board 461 may be replaced by second ground plane 459 with adequate thickness to provide sufficient mechanical strength. In still further embodiments, second conducting hemisphere 457 and second ground plane 459 may cooperate to form an empty closed conducting shell. Thus, second conducting surface 109 behaves as an antenna element, but may or may not also be an enclosure.

First ground plane 455, second ground plane 459, and insulating spacer 465 cooperate to form gap region 111. Insulating spacer 465 may further comprise ribs 467 to provide additional mechanical support and to maintain a uniform spacing between first ground plane 455 and second ground plane 459. Insulating spacer 465 further comprises vias or passthroughs like first via 469 second via 471, and third via 473.

Discharge switching means 113 comprise a variety of discharge switches like first boundary discharge switch 115 and second boundary discharge switch 117. First boundary discharge switch 115 provides an electrical connection between first conducting surface 107 and second conducting surface 109, intermediate gap region 111 through first via 469. Similarly, second boundary discharge switch 117 provides an electrical connection between first conducting surface 107 and second conducting surface 109, intermediate gap region 111 through second via 471. In alternate embodiments, discharge switching means 113 may further comprise transmit/receive switching means to enable a nano-antenna device to receive signals as well as transmit.

Charging means 225 comprise a plurality of charging switches like charging switch 116. charging switch 116 provides an electrical connection between first conducting surface 107 and second conducting surface 109, intermediate gap region 111 through third via 473.

In a preferred mode of operation, discharge switching means 113 acts so as to unify first conducting hemisphere 451 and second conducting hemisphere 457 into a single closed conducting shell. In this embodiment, first conducting hemisphere 451 and second conducting hemisphere 457 enclose a substantially spheroidal volume. Thus, first conducting hemisphere 451 and second conducting hemisphere 457 form a Faraday cage that isolates interior energy in gap region 111 from exterior energy in dielectric layer 105 and surrounding space 106. Although discharge switch 215 is shown as a single ring of boundary discharge switches including first boundary discharge switch 115 and second boundary discharge switch 117, in practice discharge switch 215 may employ as many switches in as high a density and as thick a layer as are required to unify first conducting hemisphere 451 and second conducting hemisphere 457 into a single closed conducting shell well enough for a desired efficiency. As usual, a designer must weigh performance versus cost and complexity considerations.

Alternate Nano-Antenna Device Embodiments

Preferred embodiment nano-antenna device 101 is substantially spheroidal. A spherical form factor is compact and produces a non-dispersive impulse waveform. A spherical form factor also lends itself well to theoretical analysis. The teachings of the present invention are not limited to spherical form factors, however. Alternate form factors include but are not limited to prolate spheroids, oblate spheroids, and Cartesian rectangular solids. Any form factor is likely to require modification and adaptation to the demands of a particular application, so these particular examples should be considered as merely illustrative and not exhaustive. This section will survey a few possible alternate form factors so as to give some small indication of the wide variety of variations possible for implementation of the present invention.

First Alternate Embodiment

Figure 5:
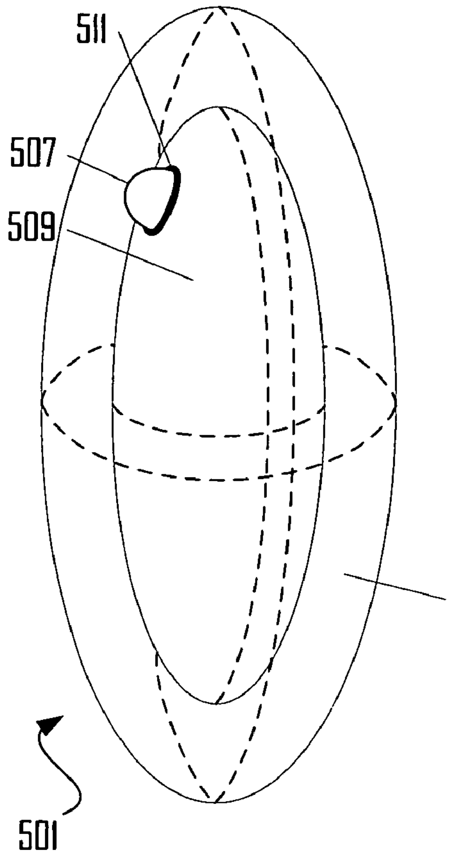
FIG. 5 is a schematic diagram of a first alternate embodiment nano-antenna apparatus.

FIG. 5 is a schematic diagram 500 of a first alternate embodiment nano-antenna apparatus 501. First alternate embodiment nano-antenna apparatus 501 comprises a dielectric layer 505, a first conducting surface 507 and a second conducting surface 509. First conducting surface 507 and second conducting surface 509 are separated by a gap region 511. First alternate embodiment nano-antenna apparatus 501 occupies a volume that is substantially similar to a prolate spheroid.

Although in general an approximate symmetry in relative size is preferred, first conducting surface 507 is much smaller in extent than second conducting surface 509. In this embodiment, first conducting surface 507 is a protuberance on second conducting surface 509. Such an asymmetric form factor is preferred if the frequency content of a desired radiated signal is higher than would otherwise be radiated by a symmetric configuration. Shaping of first conducting surface 507 and second conducting surface 509 also enables a degree of control over the radiated spectrum.

Second Alternate Embodiment

Figure 6:
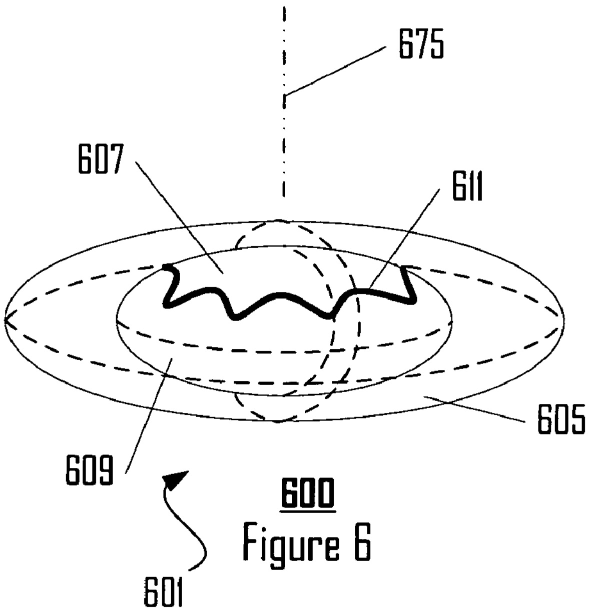
FIG. 6 is a schematic diagram of a second alternate embodiment nano-antenna apparatus.

FIG. 6 is a schematic diagram 600 of a second alternate embodiment nano-antenna apparatus 601. Second alternate embodiment nano-antenna apparatus 601 comprises a dielectric layer 605, a first conducting surface 607 and a second conducting surface 609. First conducting surface 607 and second conducting surface 609 are separated by a gap region 611.

Second alternate embodiment nano-antenna apparatus 601 has an oblate spheroidal form factor. Such a form factor is useful where a predictable device orientation is preferred. For instance, if nano-antenna apparatus 601 were deployed out of an aerial vehicle, nano-antenna apparatus 601 would likely come to rest with short axis 675 in a substantially vertical orientation.

Further, gap region 611 has a serrated or meandering form factor. The extra length of this serrated or meandering form factor helps concentrate additional electrostatic energy outside nano-antenna apparatus 601, thus making nano-antenna apparatus 601 more efficient.

Third Alternate Embodiment

Figure 7:
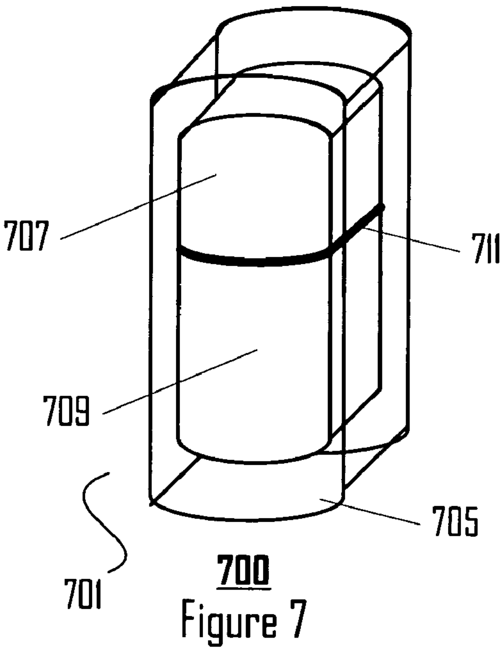
FIG. 7 is a schematic diagram of a third alternate embodiment nano-antenna apparatus.

FIG. 7 is a schematic diagram 700 of a third alternate embodiment nano-antenna apparatus 701. Third alternate embodiment nano-antenna apparatus 701 comprises a dielectric layer 705, a first conducting surface 707 and a second conducting surface 709. A first conducting surface 707 and a second conducting surface 709 are separated by a gap region 711.

Third alternate embodiment nano-antenna apparatus 701 has an approximately Cartesian rectangular solid form factor, preferred for many consumer devices. Various ratios of height to width to depth may be appropriate for various applications. Third alternate embodiment nano-antenna apparatus 701 may also be more manufacturable.

Preferred Embodiment Tag-Along Microsensor

Figure 8:
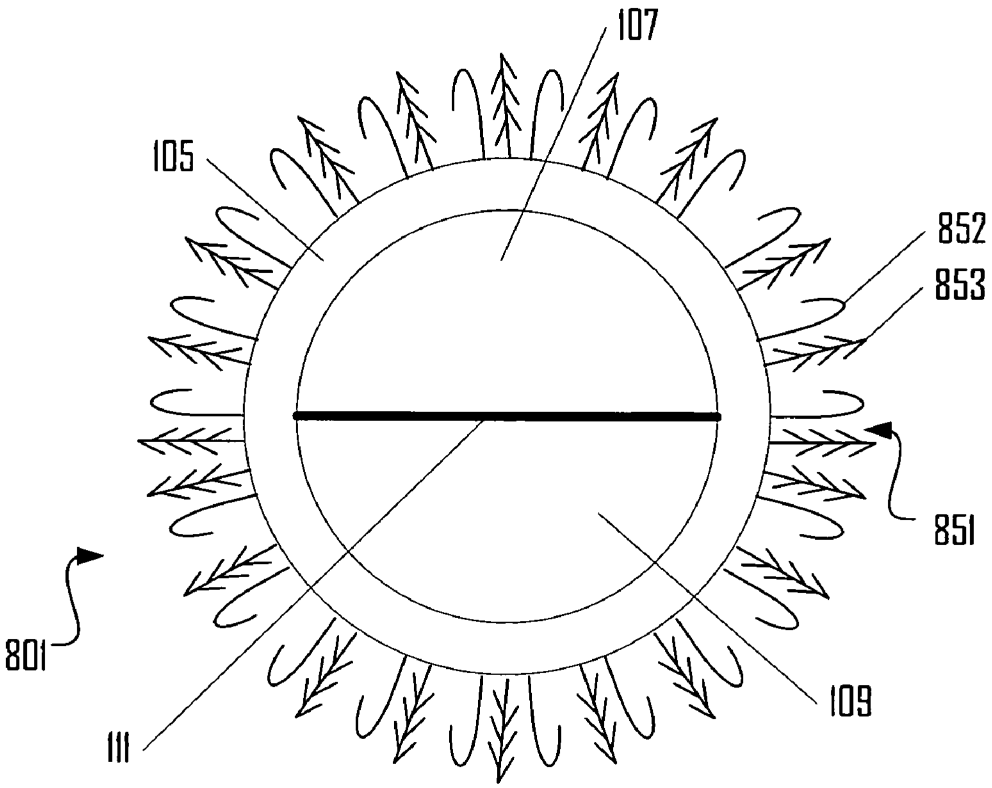
FIG. 8 is a cross-section diagram of a preferred embodiment tag-along microsensor.

FIG. 8 is a cross-section diagram 800 of a preferred embodiment tag-along microsensor 801. Tag-along microsensor 801 includes a means for transmitting signals: a nano-antenna device comprising a first conducting surface 107 and a second conducting surface 109 separated by a gap region 111. Tag-along microsensor 801 further comprises dielectric layer 105 and adhesion means 851. In a preferred embodiment tag-along microsensor 801, adhesion means 851 comprise mechanical adhesion means such as a hook 852 or a barb 853. Thus tag-along microsensor 801 is capable of sticking to or attaching itself to fabric, clothes, or hair. Tag-along microsensor 801 behaves in a way analogous to many seeds that attach themselves to animals or to the human clothing to ensure a broad area of seed dispersal. One plant employing this strategy is hoary tick-trefoil (desmodium canescens). The seeds of this legume are covered with Velcro like hairs that cause the seeds to adhere to animals or human clothing. Tag-along microsensor 801 includes adhesion means 851 to yield a similar effect. Adhesion means 851 enable tag-along microsensor 801 to be picked up and carried great distances from an original location.

Tag-along microsensor 801 further includes sensing means: a variety of sensor devices including potentially means of receiving and analyzing audio signals, inertial navigation means like an accelerometer, gyroscope, compass, or gyrocompass, chemical, biological or nuclear sensors, or other sensors recording information of value.

Alternate Embodiment Tag-Along Microsensor

Figure 9:
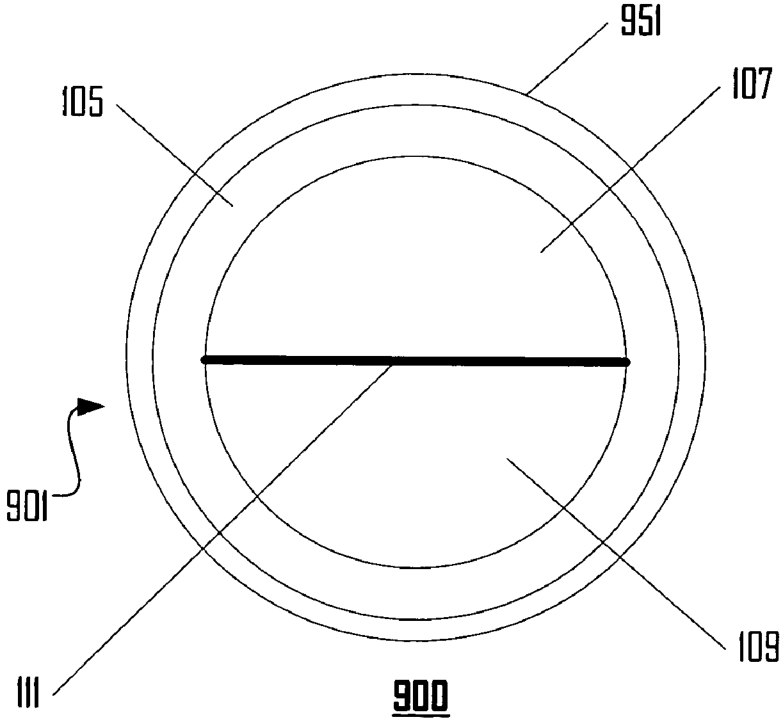
FIG. 9 is a cross-section diagram of an alternate embodiment tag-along microsensor.

FIG. 9 is a cross-section diagram 900 of an alternate embodiment tag-along microsensor 901. A tag-along microsensor 901 is a nano-antenna device comprising a first conducting surface 107 and a second conducting surface 109 separated by a gap region 111. Thus tag-along microsensor 901 includes a means for transmitting signals. Tag-along microsensor 901 further comprises dielectric layer 105 and adhesion means 951. In an alternate embodiment tag-along microsensor 901, adhesion means 951 are chemical adhesion means comprising a layer of glue or other adhesive. Adhesion means 951 may be deployed in response to a particular environmental stimulus detected by a sensor.

In alternate embodiments, a tag-along microsensor 901 may use a variety of alternate adhesion means including magnetic or static electric adhesion means. Magnetic adhesion means may include using a first conducting surface 107 or a second conducting surface 109 made of a ferromagnetic, rare earth magnetic, or other permanent magnetic material. Alternatively, one or more permanent magnetic may be embedded in tag-along microsensor 901 to effect such magnetic adhesion. Magnetic adhesion means are of particular value if it is desirable for a tag-along microsensor 901 to adhere to a vehicle or vessel.

Static electric adhesion means may be implemented by imparting an appropriate net electric charge to tag-along microsensor 901. Dielectric layer 105 tend to preserve this electric charge, making tag-along microsensor 901 behave like an electret.

Tag-Along Microsensor Mode of Operation

Figure 10:
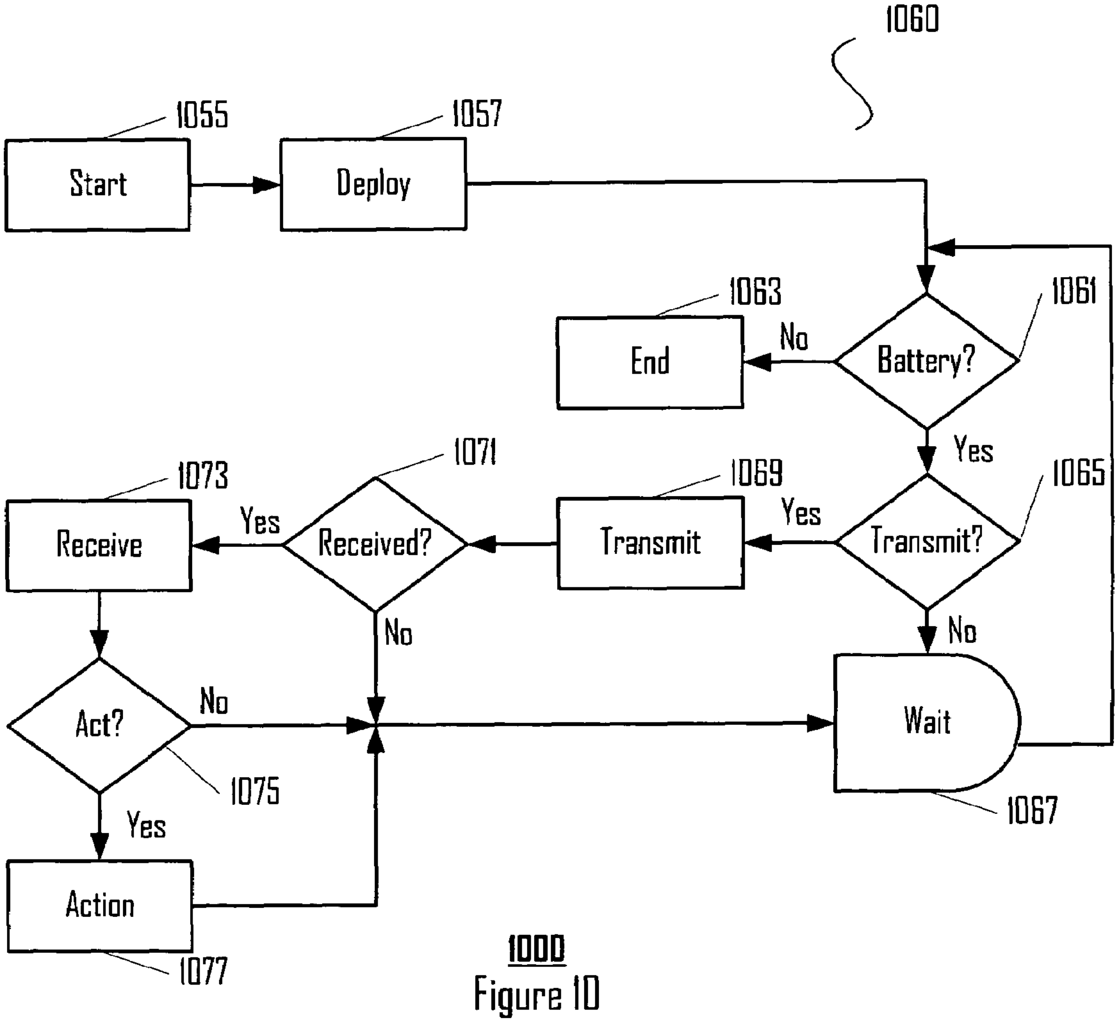
FIG. 10 is a flow chart describing a tag-along microsensor mode of operation.

FIG. 10 is a flow chart 1000 describing a tag-along microsensor mode or method of operation 1060. Mode of operation 1060 begins at start block 1055. Mode of operation 1060 continues with deploy process 1057.

In deploy process 1057, tag-along microsensors (like tag-along microsensor 801) are distributed across an area of interest. Deployment process 1057 may include broadcasting tag-along microsensors from airplanes, helicopters or other vehicles, or manually distributing, spraying, spreading, positioning, arranging, or installing tag-along microsensors in particular areas of interest. In alternate embodiments, deploy process 1057 may include a deployment in response to certain environmental stimuli such as an audio or other detection of approaching people or vehicles. In a preferred embodiment, deploy process 1057 results in a tag-along microsensor 801 adhering to an entity such as a person, an animal, or a vehicle. Deploy process 1057 can result in a large number of tag-along microsensors being deployed across an area of interest.

Tag-along microsensor mode of operation 1060 continues with battery decision block 1061. If a tag-along microsensor 801 no longer has adequate energy, battery decision block 1061 leads to end block 1063 and tag-along microsensor mode of operation 1060 terminates. A tag-along microsensor 801 may use battery energy, capacitor stored energy, vibrational energy, or other energy scavenged from the environment of a tag-along microsensor 801. If a tag-along microsensor 801 has adequate energy, then battery decision block 1061 leads to transmit decision block 1065.

Transmit decision block 1065 may lead to a transmission under a variety of circumstances. A tag-along microsensor 801 may transmit at periodic intervals. A tag-along microsensor 801 may transmit in response to particular stimuli detected by a sensor. If a tag-along microsensor 801 does not transmit, then transmit decision block 1065 leads to wait block 1067.

Wait block 1067 introduces a delay in tag-along microsensor mode of operation 1060. Once the delay of wait block 1067 is complete, tag-along microsensor mode of operation 1060 continues with battery decision block 1061.

If a tag-along microsensor 801 does transmit, then transmit decision block 1065 leads to transmit block 1067. In a preferred embodiment, transmit block 1067 is a method of operation for transmitting UWB impulses, like method of operation 330. Transmit block 1067 leads to receive decision block 1071.

Tag-along microsensor mode of operation 1060 continues with receive decision block 1071. If signals transmitted in transmit block 1067 are not received, then tag-along microsensor mode of operation 1060 continues with wait block 1067. If signals transmitted in transmit block 1067 are received, then tag-along microsensor mode of operation 1060 continues with receive block 1073.

Receive block 1073 describes reception of signals transmitted by tag-along microsensor 801 in transmit block 1067. Receive block 1073 may represent reception of signals by receivers located substantially in the vicinity of where a tag-along microsensor 801 was deployed in deploy block 1057, or receive block 1073 may represent reception of signals by receivers at distant locations such as checkpoints, chokepoints, or other location potentially traversed by an entity to which tag-along microsensor 801 may be attached.

Tag-along microsensor mode of operation 1060 continues with action decision block 1075. Data or intelligence received in signals from a tag-along microsensor 801 in receive block 1073 are evaluated. If action is not warranted, then tag-along microsensor mode of operation 1060 continues with wait block 1067. If action is warranted, then tag-along microsensor mode of operation 1060 continues with action block 1077.

Action block 1077 represents acting on intelligence, data, telemetry, or other information received in receive block 1073. Action block 1077 may include logging, recording, or otherwise storing data received from a tag-along microsensor 801 in receive block 1073. Action block 1077 may also include action to intercept, engage or otherwise deal with an entity to which tag-along microsensor 801 is attached. Once action block 1077 is complete, tag-along microsensor mode of operation 1060 continues with wait block 1067.

Specific alternate embodiments have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the apparatus and method of the present invention are not limited to the precise details and conditions disclosed and that various changes may be made therein without departing from the spirit of the invention which is defined by the following claims:

We claim:

1. A tag-along microsensor device, said device comprising:

means for transmitting a signal;

adhesion means for attaching said device to an entity, and sensing means providing information of value, said signal conveying information of value, said means for transmitting a signal further including a nano-antenna apparatus said nano-antenna apparatus comprising a first conducting surface, a second conducting surface, a gap region between said first conducting surface and said second conducting surface; and at least one discharge switch.

2. The device in claim 1 in which said adhesion means are mechanical adhesion means.

3. The device in claim 2 in which said mechanical adhesion means include either a hook or a barb.

4. The device in claim 2 in which said mechanical adhesion means include a chemical adhesive.

5. The device in claim 1 in which said adhesion means are magnetic adhesion means.

6. The device in claim 1 in which said adhesion means are static electric adhesion means.

7. The device in claim 1 in which said sensing means include sensing of audio signals.

8. The device in claim 1 in which said sensing means are chosen from the group including accelerometers, gyroscopes, compasses, and gyrocompasses.

9. A tag-along microsensor method, said method comprising the steps of:

deploying a tag-along microsensor;

transmitting a signal from said tag-along microsensor;

receiving said signal; and acting on said signal, in which said transmitting a signal from said tag-along microsensor utilizes a nano-antenna apparatus and in which said transmitting a signal from said tag-along microsensor comprises the steps of charging a first conducting surface with respect to a second conducting surface;

discharging said first conducting surface with respect to said second conducting surface;

said discharging forming a substantially continuous closed conducting shell from said first conducting surface and said second conducting surface.

10. The method as in claim 9 in which said deploying the tag-along microsensor results in said tag-along microsensor adhering to an entity.

11. The method as in claim 10 in which said entity is a person.

12. The method as in claim 10 in which said entity is a vehicle.

13. The method as in claim 10 in which said entity is an animal.

14. The method as in claim 9 in which said receiving said signal is in the vicinity of a location where said tag-along micro sensor was deployed.

15. The method as in claim 9 in which said receiving said signal is at a location a substantial distance from where said tag-along microsensor was deployed.

16. The method as in claim 9 in which said acting on said signal further includes recording data from said signal.

17. The method as in claim 9 in which said acting on said signal further includes intercepting an entity to which the tag-along microsensor is attached.

* * * * *